United States Patent Office 3,401,464
Patented Sept. 17, 1968

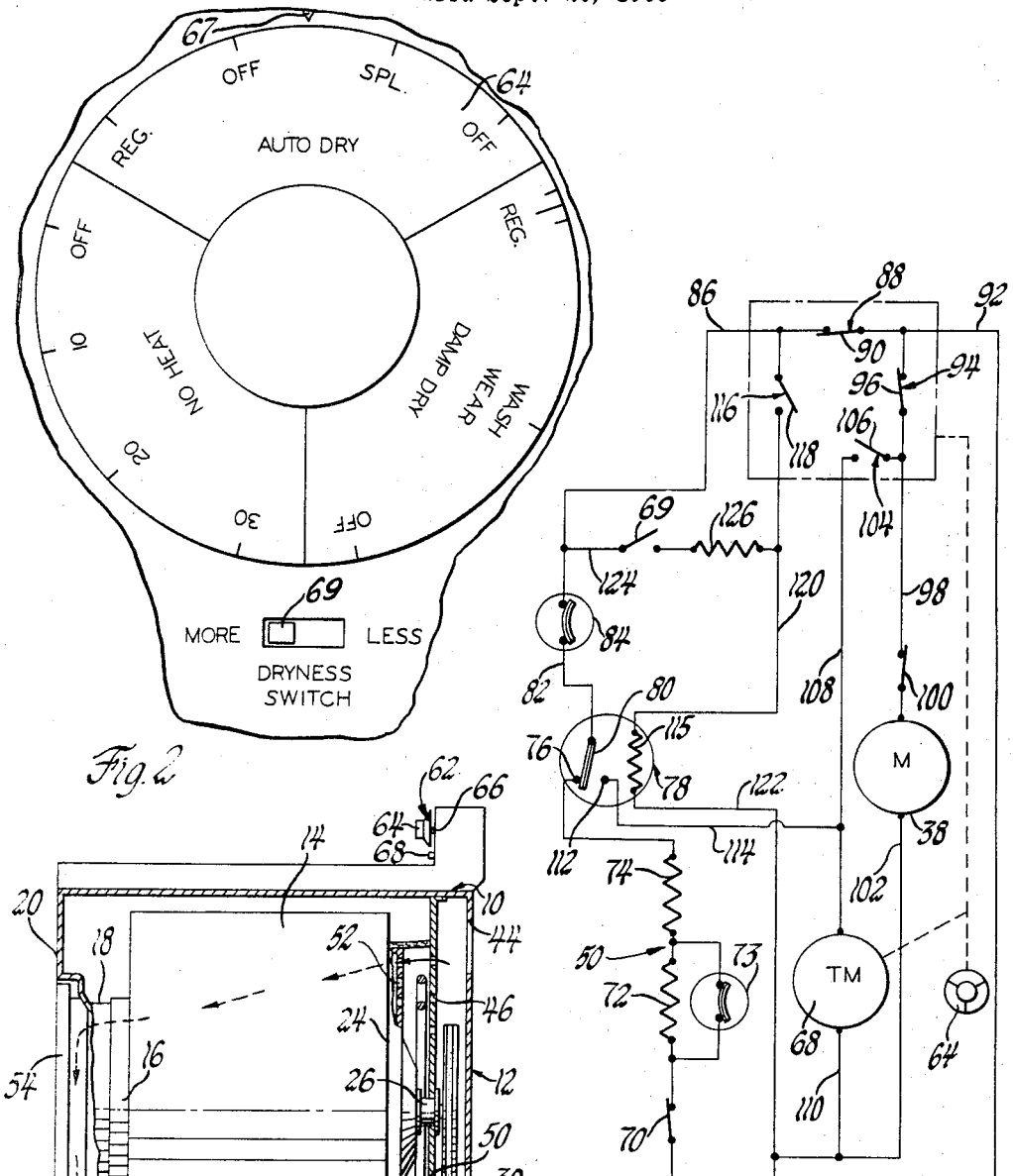

3,401,464
CLOTHES DRYER WITH SINGLE DIAL CONTROLLER
Thomas H. Fogt, West Carrollton, and Charles C. Whistler, Jr., Dayton, Ohio, assignors to General Motors Corporation, Detroit, Mich., a corporation of Delaware
Filed Sept. 23, 1966, Ser. No. 581,481
10 Claims. (Cl. 34—45)

ABSTRACT OF THE DISCLOSURE

In preferred form a clothes dryer control system including a presettable knob positioning timer controlled switches to no heat, auto dry, or damp dry cycles. A pair of thermostats in the exhaust duct control heat input and timer advance. A bias heater on one of the thermostats is energized by the timer switches during damp dry to reduce heat input to the dryer. A more or less dryness switch connects a resistor in series with the bias heater during auto dry to reduce heat input and increase the moisture content of articles being dried at the end of the auto dry cycle.

---

This invention is directed to automatic control systems for clothes dryers and more particularly to clothes dryers having two energy input levels selectively controlled in response to the temperature of a fluid stream for removing moisture from articles within a clothes dryer.

In clothes dryness control systems, thermostatic switching means are included that respond to the operating temperatures in the dryer for regulating the thermal input to the dryer so as to prevent excessive operating temperatures therein and timer means are included in association with the thermostatic temperature sensing means for terminating the dryer cycle of operation.

In thermostatically controlled drying apparatus, it is desirable to include a plural function control dial for presetting a timer control means so that the timer control means and thermostatic control means in cooperation with one another can produce plural cycles of dryer operation. A typical system of this type is set forth in United States Patent No. 2,851,789 wherein a combination timer and thermostat control system is automatically operative through an automatic and timed cycle of operation. One problem with systems of the above type is that the dryer following an automatic cycle of operation may either overdry or underdry a particular type of load that is commonly processed by a particular user. Furthermore, a control system of the type set forth in the aforementioned patent makes no provision for a damp-dry cycle of operation wherein a substantial moisture content is retained in a clothes load making it suitable for immediate ironing.

Accordingly, an object of the present invention is to improve clothes dryers by the provision of a control system including a single presettable dial for conditioning timer means and associated thermostatic means to produce separate and distinct automatic drying cycles of operation and damp-drying cycles of operation.

A further object of the present invention is to improve automatic clothes dryers by the provision of a control system including a combination thermostatically and timer controlled cycle of operation wherein means are included to modify the operating characteristics of the thermostatic control to vary the final dryness of articles following an automatic cycle of operation.

Yet another object of the present invention is to improve clothes dryers of the type having heating means therein for producing a high and low energy input level and wherein the energy level is established by first thermostatic means responding to temperatures within the dryer by the provision of heater deenergization thermostatic means conditionable to terminate heater energization upon the occurrence of a predetermined maximum temperature within the dryer and wherein means are associated with the heater deenergization thermostatic means for variably biasing the thermostatic means to vary the temperature level within the dryer at which heating is terminated.

Another object of the present invention is to provide a control system of the type set forth in the preceding object wherein the means for variably biasing the heater deenergization thermostat means includes a resistance heater having a first thermal output when energized and means including a presettable dryness control switch for varying the thermal output of the resistance heater to cause the heater deenergization thermostat means to be operative in response to reduced temperature conditions within the dryer thereby to produce less drying during an automatic cycle of operation.

Still another object of the present invention is to provide a control system of the type set forth in the preceding object wherein the heater deenergization thermostatic means is included in circuit means for energizing timer means when the heater is deenergized to condition the timer means for operating the dryer through a predetermined cool-down period constituting the terminal portion of an automatic cycle of operation.

Further objects and advantages of the present invention will be apparent from the following description, reference being had to the accompanying drawings wherein a preferred embodiment of the present invention is clearly shown.

In the drawings:
FIGURE 1 is a schematic view of a clothes dryer including the present invention.
FIGURE 2 is a fragmentary view in front elevation of a portion of the control panel of the dryer in FIGURE 1 showing a single control dial having plural operating cycle setting points thereon and an associated dryness switch.
FIGURE 3 is an electrical circuit diagram associated with the dial and switch of FIGURE 2 constituting the improved control system of the present invention.

Referring now more particularly to FIGURE 1, an automatic clothes dryer 10 is illustrated including an outer cabinet 12 enclosing a rotatable tumbling drum 14 having a front collar 16 supportingly received on an inwardly directed flange 18 on the front wall 20 of the cabinet 12 that defines an access opening 22 to interiorly of the drum 14 through which articles are loaded into the drum 14. The drum 14 includes a rear wall 24 having a shaft 26 secured thereto, that is, directed through and rotatably supported by an internal bulkhead 28 of the dryer. The bulkhead 28 and rear wall 30 of the outer cabinet 12 form a machinery compartment 32 in which is located a belt-pulley drive system 34 connected between the shaft 26 of the tumbling drum 14 and an output shaft 36 of a drive motor 38.

The drive motor 38 includes a second output shaft 40 that drives a blower 42 which is operative to draw air through an inlet port 44 in the rear wall 30 thence through the machinery compartment 32 and through ports 46 in the internal bulkhead 28 into a heating chamber 48 in which is located a heating means representatively shown as being an electrical resistance element 50. From the heating chamber 48 air is drawn through a plurality of perforations 52 in the rear wall 24 thence interiorly of the drum 14 through articles being tumbled therein. From the tumbling drum interior air passes through a ducted closure member 54 into an interiorly located duct 56 that is connected by a return conduit 58 to the inlet of the blower 42 which has the outlet thereof connected by a conduit 60 to an exhaust point exteriorly of the dryer 10.

The above described dryer apparatus is representative of one suitable dryer including a heated fluid stream that is directed through wet articles for removing moisture therefrom, it being understood that the present invention is equally suitable for association with either electric or gas dryers and to dryers having either opened or closed circulating systems for drying fluids.

The representatively illustrated machine is operated through plural and distinct cycles of operation by a controller 62 including a rotatable dial 64 operatively connected through a shaft 66 to a timer mechanism including a timer motor 68 that is connected by suitable shaft and cam means (not shown) to a plurality of timer controlled switches to be discussed. More particularly, in the illustrated arrangement, and as best seen in FIGURE 2, the single dial 64 of the controller 62 is movable with respect to an indicator 67 and is divided into three arcuate regions including an automatic dry setting zone including a regular and special setting point; a damp dry setting zone including regular and wash and wear setting points; and a no heat cycle of operation including timed segments therethrough.

Also on the control panel is located a dryness selector switch 69 presettable to more or less dryness control points.

Referring now more particularly to the electrical circuit diagram of FIGURE 3, a heater energization circuit is illustrated running from wire L-1 of a three-wire power source thence through a centrifugal switch 70 that is closed when the dryer motor 38 attains a predetermined percentage of its operating speed and thence to one end terminal of the electrical resistance element 50 that includes a first resistance segment 72 serially connected to a second resistance segment 74. A control thermostat 73 in exhaust duct 56 is electrically connected to shunt resistance segment 72 when closed. The opposite end terminal of the heater 50 is electrically connected to a first contact 76 of a high temperature control thermostat 78 in exhaust duct 56 that is operative upon sensing a predetermined maximum exhaust temperature to deenergize the heater by movement of an electrically conductive bimetallic element 80 out of electrical engagement with contact 76. The bimetallic element 80 is electrically connected by conductor 82 to a high temperature limit thermostat 84 that is operative to terminate heater energization when the drum temperature reaches a temperature at which articles therein might be damaged. The limit thermostat 84 is in turn electrically connected by conductor 86 to a timer controlled heater control switch 88 that has a single pole, single throw switch blade 90 thereof positioned opened and closed by suitable cam means driven by the timer motor 68. From the heater control switch 88 of the timer, the heater energization circuit passes through a conductor 92 to wire L-2 of the three-wire power source.

Additionally, the circuit in FIGURE 3 includes a drive motor energization circuit from wire L-2 through conductor 92 thence through a timer controlled drive motor switch 94 that has a single pole, single throw switch blade 96 opened and closed by cam means of the timer. The motor switch 94 in turn is electrically connected by a conductor 98 to one side of a door switch 100 having the opposite side thereof electrically connected to one side of the drive motor 38. The opposite side of the drive motor 38 is connected by a conductor 102 to wire N of the three-wire source to complete the dryer motor energization circuit.

Additionally, the circuit of FIGURE 3 includes a timer motor energization circuit from wire L-2 through conductor 92, the timer controlled motor switch 94 thence through a timer motor switch 104 that has a single pole, single throw movable switch blade 106 thereof controlled by advance of the timer motor. The timer motor switch 104 of the timer is electrically connected by a conductor 108 to one side of the timer motor 68 which has the opposite side thereof connected by conductor 110 to conductor 102 and thence to wire N.

An auxiliary energization for the timer motor 68 runs from wire L-2 through the timer controlled heater switch 88 thence through conductor 86, limit thermostat 84, and the movable bimetallic element 80 of the thermostat 78 when it senses a predetermined maximum temperature. At this point the bimetallic element 80 will separate from contact 76 of the thermostat 78 and engage a second contact 112 therein that is electrically connected by conductor 114 to conductor 108 thence through the timer motor 68 to wire N.

The high temperature thermostat 78 includes an electrical resistance heater 115 therein that is energized through a bias heater circuit from wire L-2 through the timer controlled heater contact 88 thence through a timer controlled damp-dry switch 116 having a single pole, single throw movable switch blade 118 that, when closed, is electrically connected through a conductor 120 to one side of the bias heater 115. The opposite side of the bias heater 115 is connected by a conductor 122 directly to wire N.

During an automatic dry cycle of operation, the timer through suitable shaft and cam means opens the damp-dry switch 116 thereby deenergizing the bias heater 115. For reasons to be discussed, during the automatic dry cycle of operation, the bias heater 115 may be energized through a supplemental energization circuit from wire L-2 through the timer controlled heater contact 88 thence through conductor 86 to a conductor 124 that is electrically connected through the dryness switch 68 which is closed when the switch is positioned to the less dryness position. The switch 68 is electrically connected to one end of a resistance element 126 that has the opposite end thereof connected to the resistance heater 115 of the high temperature thermostat 78 through the conductor 120. The supplemental energization circuit for the resistance heater 115 will produce a lesser thermal output therefrom than the normal energization circuit therefor through the damp-dry switch 116 by virtue of the inclusion of the resistance 126 in series therewith.

If it is desired to operate the dryer 10 through a regular automatic dry cycle of operation, which is suitable for most regular dryer loads, following loading of the drum 14, closing of the door 54 and positioning of the control dial 64 to the regular automatic dry position, the above described circuit is conditioned as follows. The door switch 100 is closed, the timer switches 88, 94 are closed and the timer switches 106, 116 are opened. The energization circuit for dryer motor 38 is thereby completed and the centrifugal switch 70 will close when the dryer motor 38 attains a predetermined percentage of its speed to complete the energization circuit for the heater 50.

The low temperature thermostat 73 and high temperature thermostat 78 of the control circuit of FIGURE 3 sense the temperature of air passing through exhaust duct 56 of the dryer 10. Since the articles in the drum initially have a substantial moisture level therein, the exhaust stream temperature is relatively low. In one working embodiment, the low temperature thermostat 73 shunting the resistance elements portion 72 is operative to respond to an exhaust stream temperature of 128° F. Furthermore, the resistance element segment 74 has a value of 10 ohms and the resistance element segment 72 has a value of 5 ohms. Since the resistance segment 72 initially is shunted by thermostat 73, the voltage output of the heater 50 in the working embodiment has a high energy output of 5,400 watts. The tumbling articles are subjected to the high level heat until the clothes are nearly dry at which point the outlet air temperature in the duct 56 will rise to 128° F. where the low temperature thermostat 73 will open to cause the resistance segment 72 to be serially connected with the resistance segment 74. The wattage output from the heater 50 is thereby reduced in the illustrated arrangement to a low level of 3,600 watts. As the clothes dry further, the air temperature rises above 128° F. to a temperature of 143° F., which in the illustrated arrangement is sufficient to cause the bimetallic element 80 of the high temperature thermostat 78 to move from the contact 76 thereof so as to deenergize the heater and engage the contact 112 to energize the timer motor 68. The timer motor runs causing the heater contact 88 thereof to open and the timer motor contact 104 thereof to close. Following a predetermined cool-down period wherein the tumbling drum 14 is driven by the motor 38 so as to reduce the temperature of the clothes so that they are easily removed from the tumbling drum 14, the timer will open the motor contact 94 thereof to terminate dryer operation.

It has been found that with a regular automatic dry cycle of the type set forth above, that most regular loads are slightly overdried. In accordance with certain principles of the present invention, if a user desires a slightly less dry condition in loads dried through the regular automatic dry cycle, the dryness switch 69 can be positioned in its less dry position thereby causing energization of the bias heater 115 in the thermostat 78 to produce a thermal output therefrom that causes the thermostat 78 to terminate heat input at a reduced temperature of a predetermined value, for example, at 138° F., thereby causing the dryer operation to terminate sooner under control of the timer motor and associated switches than would ordinarily be the case during the regular automatic dry cycle, thereby leaving a slightly greater amount of moisture in the clothes.

When the dryness switch is in its more position, during auto dry operation, the switch 116 is opened. Switch 69 is opened and bias heater 115 will thereby be deenergized. Accordingly, the dryer will operate under the control of high temperature thermostat 78 to terminate heat input when the exhaust temperature attains 143° F. at which time the element 80 engages contact 112 to energize timer motor 68.

For certain small loads of hard to dry articles, the controller 62 includes a special automatic dry position as shown in FIGURE 2. When the controller is set to this position, the automatic dry cycle works in the manner set forth in the regular automatic dry position except that because of the characteristics of the clothes, the high temperature thermostat 78 will cycle open and closed during terminal drying each time it senses 143° F. exhaust temperatures to cycle the heater input from 3,600 watts to zero watts until the clothes are dry. The timer is positioned so that the heater switch 88 and motor contact 94 thereof will remain closed until the movable bimetallic element 80 of the high temperature thermostat 78 has maintained the timer motor 68 energized through a predetermined integrated on period following which time the heater switch 88 is opened therein, following which point the cool-down period is entered that is terminated by opening of the motor switch 94 in the timer.

In accordance with certain other principles of the present invention, the single dial 64 includes a separate damp-dry operation wherein a substantial percentage of moisture is retained in a clothes load following dryer operation. More particularly, during the damp-dry cycle of operation, the dial 64 is positioned to, in the case of regular loads, the regular setting in the damp-dry zone. At this position, the timer is conditioned to cause switch 88, motor switch 94 and damp-dry switch 116 to be closed and the timer motor switch 104 to be opened. By virtue of the fact that the damp-dry switch 116 is closed, the bias heater 115 has the full thermal output thereof available causing the high temperature thermostat 78 to operate in response to exhaust stream temperatures below those normally causing the low temperature thermostat 73 to open. The operating temperature with full bias of the high temperature thermostat in one working embodiment was at 120° F. This temperature was selected since it is above the balance temperature within the tumbling drum for most loads; balance temperature being that temperature at which the exhaust stream levels out during a normal drying operation. The 120° F. control point is above the balance temperature for large size loads that are processed by the dryer so that the thermostat 73 will for such loads, be maintained in a continuously closed position so as to direct the high energy output from the heater 50 to the dryer. During the damp-dry cycle of operation, the timer motor switch 104 is closed and a preselected period of time is selected to establish the period of the regular damp-dry cycle under the control of the fully biased thermostat 78. For most regular loads, it is found that a sixteen minute timed cycle in conjunction with the thermal control of the fully biased thermostat 78 will produce cycle termination with a retain moisture of 20 to 30% in the loads.

Smaller loads at the damp-dry regular position tend to operate at a higher balance temperature which has been found to be above the 120° F. operating point of the fully biased thermostat 78. Therefore, for smaller loads, the thermostat 78 cycles the heater 50 on and off thereby supplying less heat to the smaller loads to thereby maintain a similar amount of retained moisture therein for the same given preselected total cycle time as established by operation of the timer motor 68.

In the illustrated arrangement, the damp-dry setting zone includes a wash and wear setting that positions the timer switches so as to produce a six minute predetermined time cycle under the control of the fully biased thermostat 78. This has been found desirable since the original moisture retention on many wash and wear materials is somewhat less than on regular materials.

By virtue of the above described damp-dry control system, various sized loads can be dried to substantially the same retained moisture following an automatic drying cycle of operation merely by requiring the addition of one switch in a conventional timer control that is operatively associated with means for biasing a thermostat that is ordinarily present for terminating a dryer operation in an automatic dryer control system utilizing exhaust temperature for initiating the termination of the dryer operation through the timer mechanism.

The controller 62 further includes a no heat automatic cycle of operation that is obtained by positioning the control dial 64 so that the indicator 67 is located at a predetermined time in the no heat setting region on the dial 64. At such a position, the heater contact 88 of the timer is opened and the motor contact 94 and timer motor contact 104 are closed. As a result, the motor 38 is energized to rotate the tumbling drum 14 and to drive the blower 42 to circulate therethrough. Articles are thereby processed without heating for a period as established by positioning of the dial 64 up to 30 minutes following which time the dryer motor switch 94, the timer is opened to terminate dryer operation.

From the above described embodiment of the present invention, it will be appreciated that a wide range of different automatic cycles of dryer operation are obtainable and furthermore that the automatic operations are easily established merely by rotation of a single control member and/or positioning of a single switch in the case where a slightly less drying is desired during a regular automatic dry cycle of operation. Furthermore, in the case of the damp-dry cycle of operation, the circuitry is responsive to large and small load sizes in that the full heater input is directed into the dryer for large loads to quickly remove moisture therefrom and cycles for small loads to maintain the desired final percentage of moisture constituting damp dryness during a timed period of a predetermined value constituting the damp-dry cycle. As a result, different load sizes can be processed automatically and the dryer operation terminated with a desired amount of retained moisture. By the provision of the particular thermostatic control and two level heat input during the automatic dry cycle, it has been found that regular loads are processed in a relatively short period of time without any substantial overdrying and moreover that small loads of hard to dry articles can be relatively quickly automatically dried without overdrying by merely modifying the timer as discussed above while retaining the same operative thermostats in the system.

While the embodiment of the present invention as herein disclosed constitutes a preferred form, it is to be understood that other forms might be adopted.

What is claimed is as follows:

1. In drying apparatus, the combination of a drum for tumbling articles to be dried, means for driving said drum including motor means, means for circulating a heated fluid stream through said tumbling drum including motor means and heating means having a high and a low energy output, means for controlling said motor and heating means including timer means having a plurality of switch means, one of said switch means controlling energization of said motor, another of said switch means controlling energization of said heater, and still another of said switches controlling energization of said timer motor, said control means further including thermostatic means responsive to the temperature of the heated fluid stream including means responsive to a predetermined temperature level for de-energizing said heating means and concurrently energizing said timer means for opening said another of said switch means for deenergizing said heater means at the beginning of a predetermined cool-down period, and means for biasing said thermostatic means to operate at a reduced fluid stream temperature for increasing the retained moisture in the articles following the cool-down period.

2. In the combination of claim 1, said means for biasing said thermostatic means including manually presettable switch means and a bias heater operative following closing of said manually presettable switch means for conditioning said thermostatic means to operate at a reduced temperature.

3. In the combination of claim 1, said plural switch means of said timer means including damp-dry switch means, and means responsive to a predetermined setting of said damp-dry switch means to bias said thermostatic means to cause operation thereof at a predetermined temperature above a predetermined balance temperature for a predetermined size clothes load whereby said thermostatic means is conditioned to maintain said heating means energized continuously for a predetermined period of time following which said timer means is operative to open said timer control heater switch means for deenergizing said heating means.

4. In clothes drying apparatus, the combination of a drum for tumbling articles to be dried, means for rotating said drum including motor means, means for circulating a heated fluid stream through said tumbling drum including plural energy output heating means, circuit means for controlling energization of said motor means and said heating means including timer means having a first switch for controlling energization of said motor means, a second switch for controlling energization of said heating means, and a third switch for controlling energization of said timer means, said circuit means for energizing said heating means including thermostatic means responsive to the heated fluid stream operative in response to a first predetermined temperature for reducing the energy output of said heating means and operative in response to a second predetermined temperature for deenergizing said heating means and concurrently conditioning said timer means to produce a predetermined timed cool-down period following which said timer controlled heat and motor switches are conditioned to terminate operation of the apparatus.

5. In the combination of claim 4, said timer means including a fourth switch, biasing means including said fourth switch operative upon a predetermined positioning of said fourth switch to condition said thermostatic means for producing deenergization of said heating means at a temperature below said second predetermined temperature, whereby a predetermined percentage of retained moisture is present in the tumbled articles following said predetermined cool-down period.

6. In the combination of claim 5, resistance means and manually presettable switch means operative in conjunction with said fourth timer switch and said timer controlled heater switch to condition said biasing means to produce a reduced energy output therefrom, said thermostatic means being conditioned by said reduced energy output from said biasing means during periods when said fourth timer switch is opened to produce deenergization of said heating means at a predetermined temperature intermediate said first and said second mentioned predetermined temperatures.

7. In the combination of claim 5, said heating means including first and second series connected electrical resistance elements, said thermostatic means including a first thermostat shunting one of said serially connected resistance elements to maintain a high energy output from said heater elements, said first thermostat responding to said first predetermined temperature in said heated fluid stream to open the shunt about said one of said electrical resistance elements thereby to reduce the energy output from said resistance elements, said thermostatic means including a second thermostat operative upon sensing said second predetermined temperature in excess of said first predetermined temperature to deenergize said electrical resistance elements.

8. In the combination of claim 7, means for energizing said timer means independently of said timer controlled timer means switch including said second thermostat during periods when said electrical resistance elements are deenergized.

9. In the combination of claim 7, said biasing means for selecting a damp-dry cycle of dryer operation including means for biasing said second thermostat to deenergize said electrical heater means at a temperature intermediate said first predetermined temperature and said second predetermined temperature, and to concurrently energize said timer means, said timer means following a predetermined period of time, conditioning said fourth switch to deenergize said biasing means.

10. In the combination of claim 9, means including a manually presettable switch and resistance means for varying the energy output of said bias means so as to terminate energization of said electrical heater means at a temperature below said second predetermined temperature.

References Cited
UNITED STATES PATENTS

| | | | |
|---|---|---|---|
| 2,621,423 | 12/1952 | Clark | 34—45 |
| 2,851,789 | 9/1958 | Dunkelman | 34—45 |
| 3,218,730 | 11/1965 | Menk et al. | 34—45 |
| 3,302,299 | 2/1967 | Scherzinger | 34—53 XR |

FREDERICK L. MATTESON, JR., *Primary Examiner.*

A. D. HERRMANN, *Assistant Examiner.*